P. T. ZOLLARS.
SHOCK LOADER.
APPLICATION FILED FEB. 19, 1912.
1,102,848.
Patented July 7, 1914.
5 SHEETS—SHEET 4.
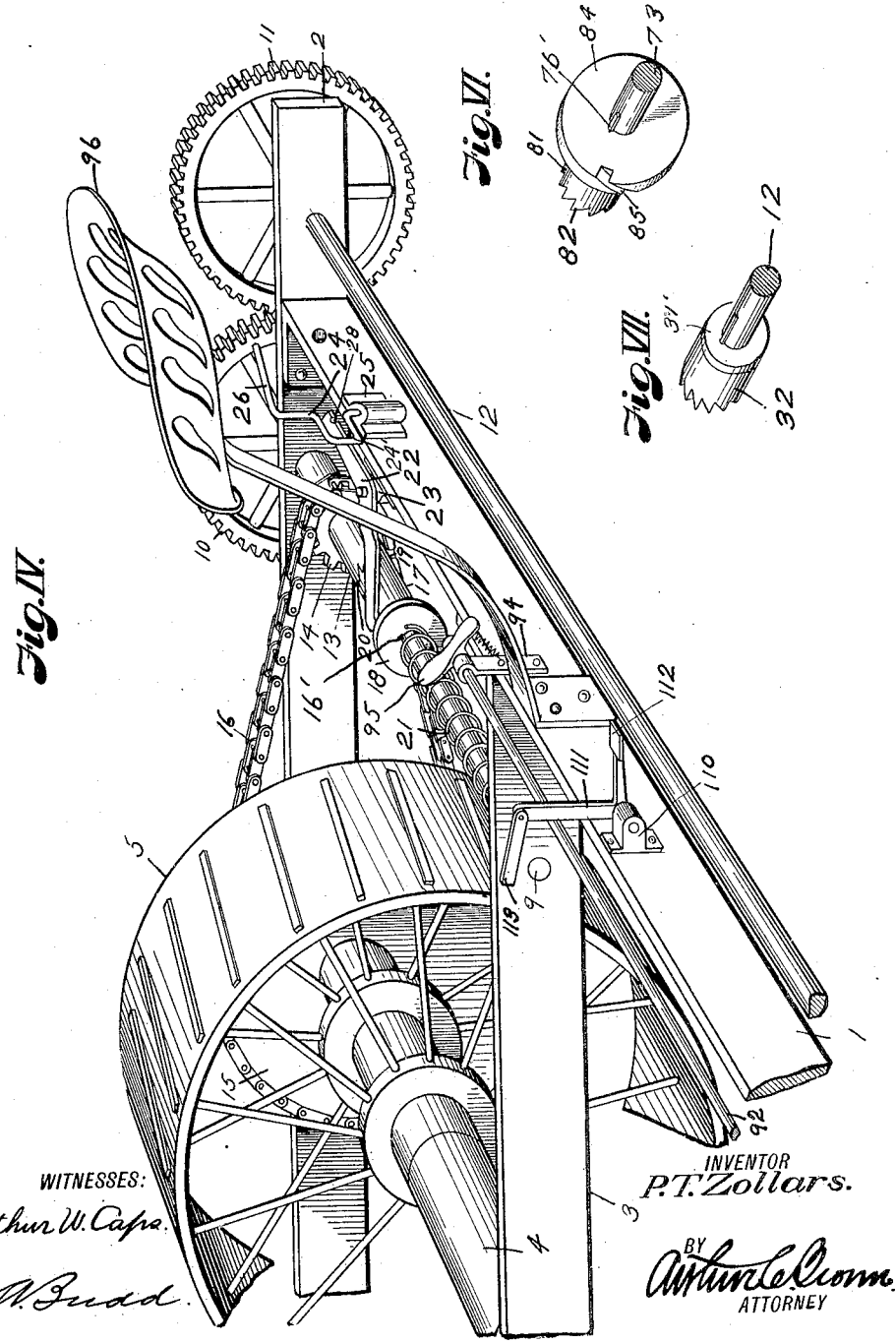
WITNESSES:
INVENTOR
P. T. Zollars.
BY
ATTORNEY

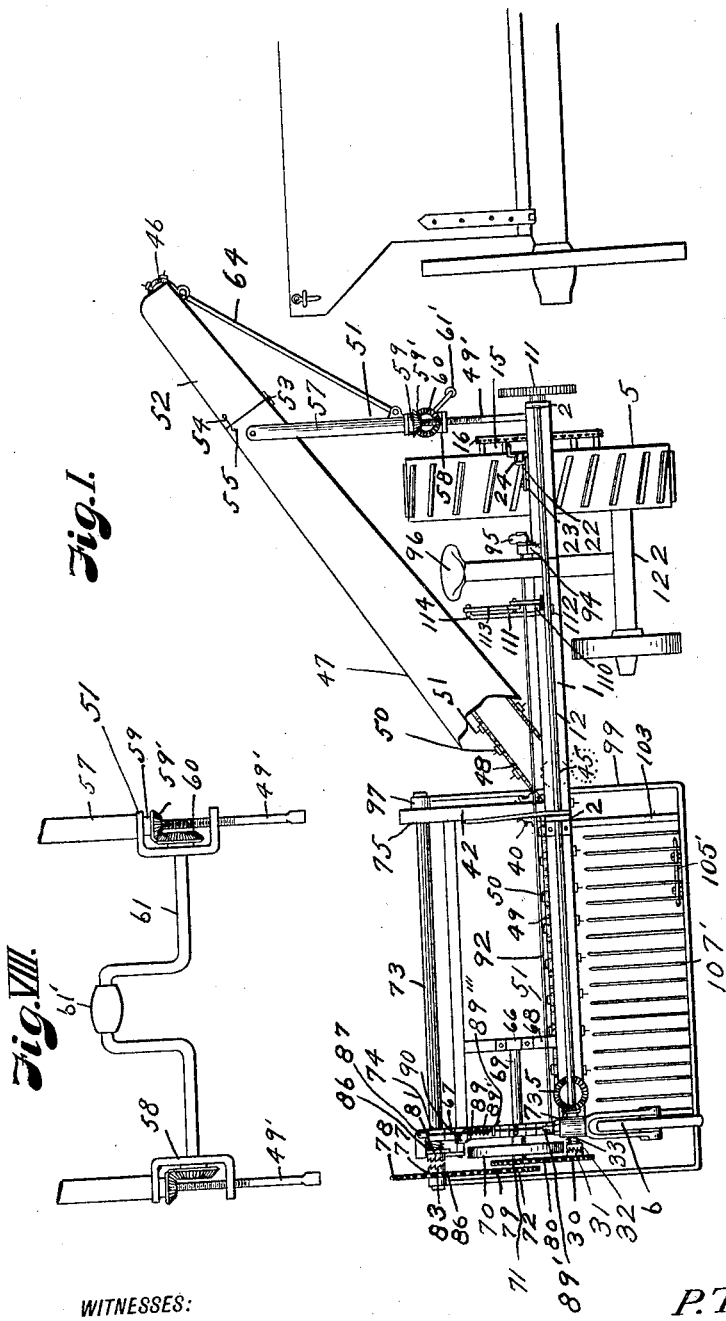

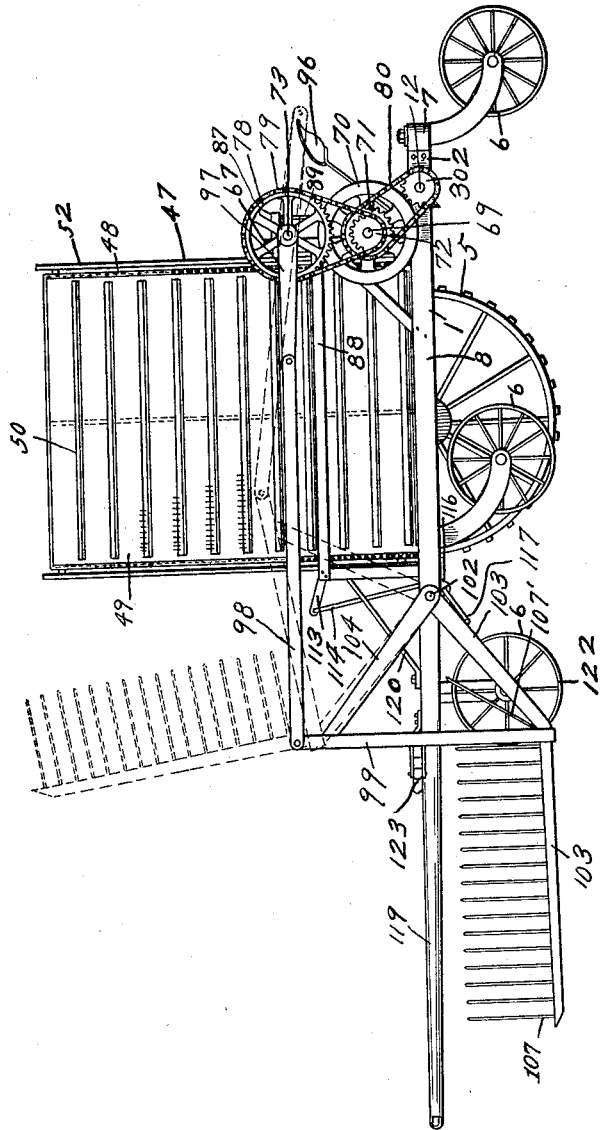

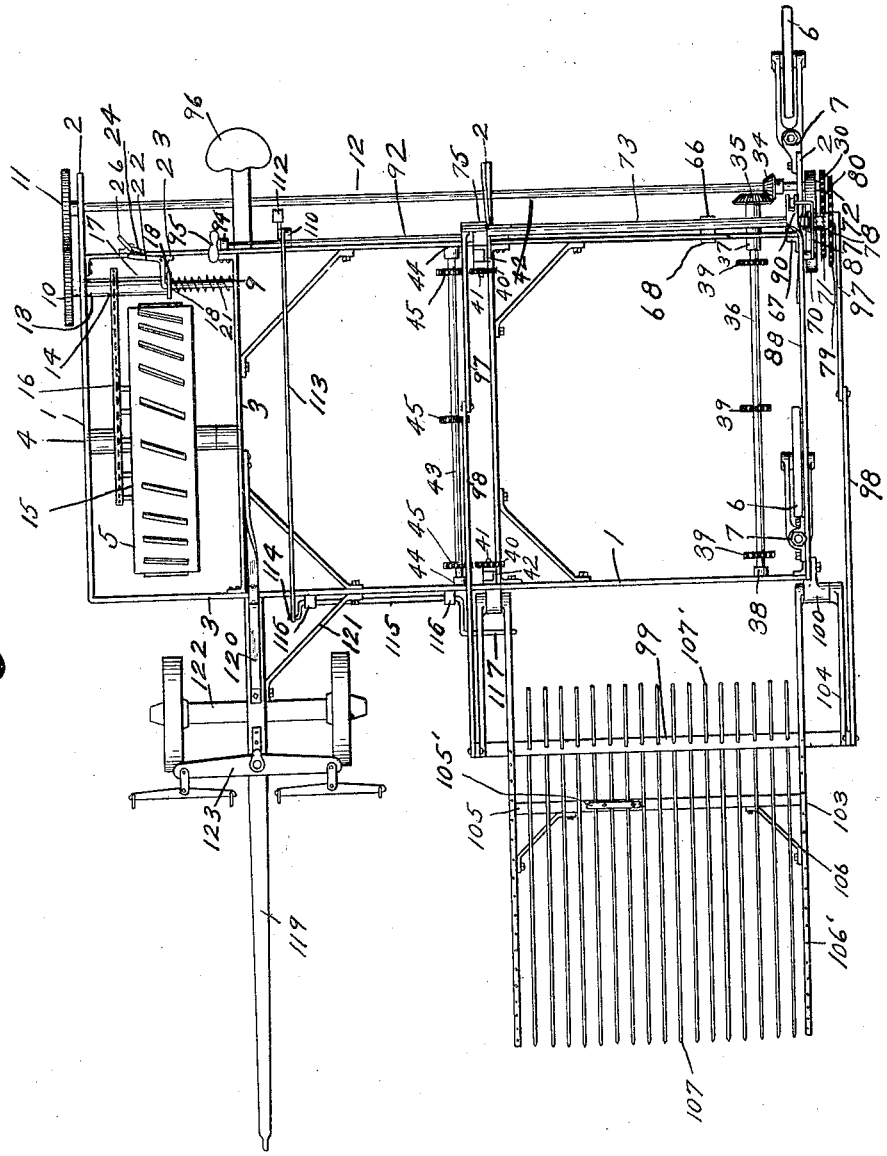

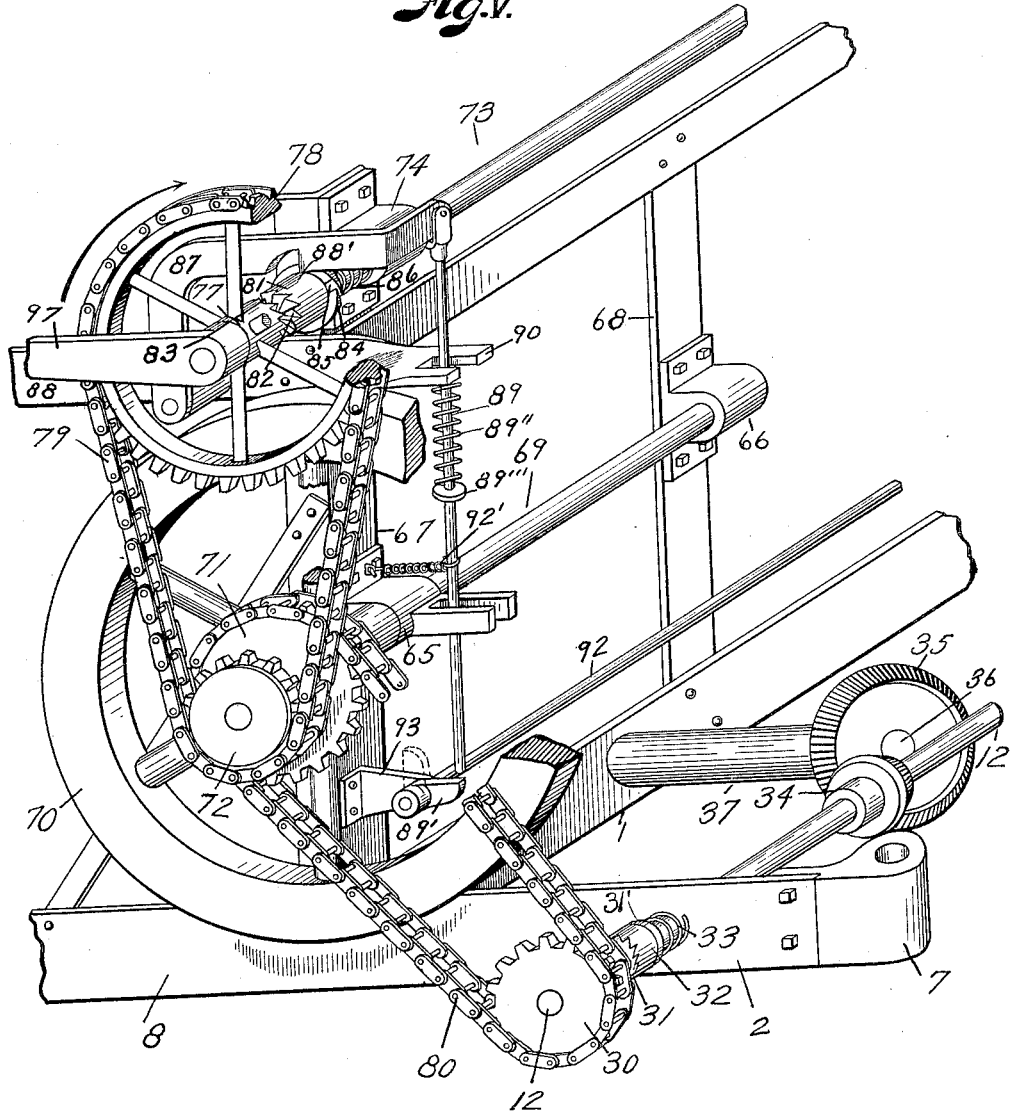

UNITED STATES PATENT OFFICE.

PAUL T. ZOLLARS, OF OLATHE, KANSAS.

SHOCK-LOADER.

1,102,848.   Specification of Letters Patent.   Patented July 7, 1914.

Application filed February 19, 1912. Serial No. 678,439.

*To all whom it may concern:*

Be it known that I, PAUL T. ZOLLARS, a citizen of the United States, residing at Olathe, in the county of Johnson and State of Kansas, have invented certain new and useful Improvements in Shock-Loaders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a shock loader, and more particularly to an implement for picking shocks of wheat, or the like, from the ground and loading same onto a wagon, the object of the invention being to provide an implement of this character wherein the lifting operation is mechanically performed and manually controlled, so that the loading operation may be performed at a proper moment irrespective of the spacing of the shocks or the weight thereof.

It is a further object of the invention to provide an implement of this character whereby the loading mechanism is carried through a complete operation after being released or tripped, thereby obviating any likelihood of the mechanism returning to set position before a load has been discharged therefrom.

Other objects of the invention will appear from the following description, wherein reference is had to the accompanying drawings forming part of this specification, wherein:—

Figure I is a rear end view of my improved shock loader, showing an elevator and a wagon in position for receiving shocks therefrom. Fig. II is a side view of the loader, showing the rake in elevated or discharging position, in dotted lines. Fig. III is a plan view of same, the elevator and conveyer being removed to show the parts therebeneath. Fig. IV is an enlarged detail perspective of the ground wheel and operating and controlling mechanism. Fig. V is a similar view of the mechanism for operating the rake. Fig. VI is a detail perspective of the worm disk on the rake driveshaft. Fig. VII is a detail perspective of the automatic clutch on the main drive shaft. Fig. VIII is a side elevation of the adjustable support of the conveyer frame.

Referring more in detail to the parts, 1 designates a body frame, which is preferably formed of steel bars, the end members of which have rearwardly projecting arms 2. At one end of the frame is a crossbar 3, and journaled in said crossbar and in the adjacent end of the frame, is an axle 4, for a traction wheel 5, upon which that end of the frame is supported. The opposite end of the frame is carried on caster wheels 6, revolubly mounted in vertical bearings 7, on the end bar 8, the rear caster wheel being on the rearwardly projecting arm 2, outside of the body of the frame. Journaled in crossbar 3, and the frame bar 1, is a shaft 9, having a gear wheel 10, meshing with a like wheel 11, rigidly mounted on a shaft 12, which latter extends back of the body frame and is journaled in the rearwardly projecting arms 2. Loosely mounted on the shaft 9 is a sleeve 13, having a sprocket wheel 14, and running over said sprocket, and over a sprocket 15 on the axle 4, is a chain belt 16, by which the sleeve 13 is continuously revolved when the loader is in motion.

On shaft 9 adjacent the sleeve 13 is a feather key 16', and slidably mounted on the shaft, over the key 16', is a clutch member 17, one end of which has a flange 18 and the opposite end clutch teeth 19 which are adapted to mesh with similar teeth 20 on the sleeve 13. A coil spring 21 is located on the shaft 9, the ends of which abut against the crossbar 3 and the annular flange 18 of the clutch member respectively to force the latter toward the sleeve 13.

A bell crank lever 22 is pivoted in bearing 23 on the frame 1, with one end engaging the flange 18 and the other end in position for engagement by the crank member 24' of a shifting lever 24 which is revolubly mounted in bearings 25 on the frame. The lever 24 has a handle 26 which extends to a position adjacent to the operator's seat. The crank member 24' is adapted to rock the bell crank lever and disconnect the clutch members 19 and 13, when it is desired to throw the traction wheel 5 out of engagement with the lifting mechanism, the lever 22 having a notch 28 within which the crank member is held to maintain the disconnected relation against the tension of the spring 21.

Loosely mounted on the opposite end of shaft 12 is a sprocket wheel 30 and a clutch sleeve 31, and slidably mounted on the shaft is a clutch sleeve 32, having a feather key similar to the key 16, whereby it is held against revoluble movement on the shaft, the sleeve 32 being tensioned toward the sleeve 31 by a coil spring 33 which abuts against the adjacent frame bar and against a washer 31' at the end of the sleeve.

Rigidly mounted on shaft 12 is a bevel gear 34 which meshes with a larger gear wheel 35 on a shaft 36 which is journaled in the bearings 37 and 38 in the frame 1. A plurality of sprocket wheels 39 are mounted on shaft 36, and sprocket wheels 40 are disposed on stub shafts 41, carried by standards 42 on the frame. A shaft 43 is mounted in bearings 44 on the frame and carries sprocket wheels 45 in alinement with the sprocket wheels 39 and 40. Similar sprocket wheels 46 are mounted in the upper end of the inclined conveyer frame 47, and conveyer belts 48 are run over the sprocket wheels 39 and 46 and under gears 40 and 45, so that the conveyer carried thereby may travel horizontally over the body of the frame and at an incline up the conveyer frame. The belts carry an apron 49 comprising a plurality of horizontal cleats 50, having spikes 51 disposed thereon with their pointed ends extending above the cleats. The apron 49 travels with the chain belts 48 and is controlled by the aforesaid crank 24 which is for throwing the conveyer driving mechanism into and out of operative connection with the traction wheel 5. The conveyer frame 47 projects over one side of the body frame and is supported therefrom by the adjustable standards 51, which will presently be described, and has an extended portion 52, hinged at 53, to the main conveyer frame 47. The extended portion 52 is provided with a hook 54, and the body portion with an eye 55 for receiving the hook to hold the parts in alinement. The conveyer frame is adapted for vertical adjustment on the rods 49' by threading the upper ends of the rods and projecting same into tubes 57, which depend upon the free end of the conveyer and connect with the upper ends of yokes 58, the lower ends of which serve as guides for the upper ends of the rods. Mounted on each of the rods are screw members 59 having bevel gear heads 59' supporting the yokes 58 and tubes 57, and meshing with mating gears 60 on an auger member 61 having a handle 61' disposed between the tubes 57 with opposite ends bearing in the yokes 58 so that when the handle is turned the bevel gear members 59' will be raised or lowered on the standard rods to raise or lower the free end of the conveyer. A rod 64 rises from the lower ends of the tubes 57 and supports the extended conveyer portion 52.

Mounted in bearings 65 and 66 on the vertical uprights 67 and 68 of the frame 1 is a shaft 69 which projects beyond the upright 67 and has a fly-wheel 70 and sprocket wheels 71 and 72 disposed on the extended end thereof, the wheel 71 being operatively connected with the sprocket wheel 30 on the shaft 12 by a belt 80.

A shaft 73 is mounted in bearings 74 and 75 on the vertical uprights 67 and 42 at the top of the frame 1 and has one end extending from the bearing 74. Loosely mounted on the extended end of shaft 73 is a sleeve 77, having a sprocket wheel 78 fixed thereon, and running over said sprocket wheel and over wheel 72, on the shaft 69, is a chain belt 79.

Feathered on the shaft 73, by a key 76', is the clutch 81, having a toothed portion 82 adapted to engage a similar toothed portion 83 on the sleeve 77. The opposite end of the clutch 81 is provided with an annular flange member 84, having a worm slot 85, disposed in periphery thereof. A coil spring 86 surrounds shaft 73, between the bearing 74 and the clutch 81 and engages the annular flange 84 to tension the clutch 81 into engagement with the sleeve 77.

A latch member 87 is pivotally mounted on the horizontal cross-bar 88 and extends upwardly and over the clutch and sleeve members 81 and 77, having a lip 88' formed thereon and adapted for engagement with the worm slot 85 of the annular flange 84. The end of latch member 87 is bent at right angles, and has a trip rod 89 pivoted thereto, the lower end of the rod being adapted for engagement by a trip dog 89', on a horizontal cross rod 92' and the body of the rod being adapted for guided travel in the slotted extension on the bearing 65, and in a slotted arm 90, the rod being yieldingly held in lowered position by a coil spring 89" which engages a sleeve 89''' on the rod and the guide fork 90. The rod 92, carrying the trip member 89' is mounted in bearings 93 and 94, on the vertical upright 67 and on the main frame 1, and has a heel and toe pedal 95 mounted thereon, adjacent the seat 96, whereby the said pedal is actuated by the operator's foot to lift the latch member 87 out of the path of the sleeve flange 84, so that the spring 86 may throw the keyed clutch member into mesh with its mate. A spring 92' holds the rod 89 yieldingly toward the standard 65 but allows the rod to yield outwardly when the trip dog returns to its setting position.

Rigidly secured to the ends of shaft 73 are arms 97', having pivotal connection with end portions of links 98', the opposite ends of which are pivotally connected with the upper ends of a U-shaped fork bar 99 which forms the body member of the rake. Revolubly mounted in bearings 100 at the front end of the main frame 1 are pins 102, the ends of which project beyond the bearings and carry, at their outer sides, the fork side bars 103, which extend downwardly and forwardly to the base of the U bar, to which they are secured, and thence forwardly therefrom. Fixed to the opposite ends of said pins are bars 104 which extend upwardly to the top of the U bar arms 99 and are fixed thereto to space the bars from the main frame when the fork is rocked, as will presently be described. Fixed to the side bars 103, in front of the U bar, is a cross beam 105, which is preferably braced from said bars by brackets 106. Fixed to the base of the U bar, preferably by socketing their ends therein are fork teeth 107 which extend forwardly and have pointed ends in alinement with the front ends of the side bars 103, being supported on the cross beam 105 and fixed thereto, preferably by a strap 105', which may be screwed or riveted to the beam. Rising from the upper edges of the side bars 103 and from the base of the U bar are keeper teeth 106'—107' the former being perpendicular to their bars and the latter, comprising the closed end of the fork, being extended upwardly and rearwardly from the fork, so that the shocks elevated by the fork will be guided onto the conveyer when the fork is lifted to dumping position. The fork is mechanically operated through the clutch mechanism, heretofore described, but I also provide the following manual means for lifting same, so that it may pass over obstructions in its path: Pivoted in the bearing 110, on frame 1, adjacent the seat, is the bell crank lever 111, having a pedal 112 at one end and a rod 113 pivotally secured to its other end and extending to and pivotally connected with a crank 114 of shaft 115 which is mounted in bearings 116 on the front of the frame. The end of shaft 115 opposite the pedal crank has a cranked part 117 extended beneath one of the U bar arms 103, so that when the shaft is rotated, by pressing down on the pedal 112, the crank 117 engages the U bar arm and lifts the fork so that it may pass over obstacles in its path without being carried through a full dumping movement.

A tongue 119 is supported on the frame 1 and cross bar 3 by the top brace 120 and the side brace 121, and a truck 122 and swingle and double trees 123 are provided for draft purposes.

Presuming the parts to be assembled, as described, the loader may be conducted to a field, the fork being held out of operative position by disconnecting clutch 13, and lifting the rake through the pedal mechanism 112 and its connected parts. When the machine is in the field the conveyer is extended and a wagon driven alongside of the machine with its bed beneath the delivery end of the conveyer so as to receive material therefrom, the fork being propelled in the path of the shocks to be loaded, with the driving mechanism in clutch and the fork lowered so that it drags along the ground so that the fork bars will be projected beneath the shocks and the latter raised onto the fork bars. When the fork is loaded the operator rocks the pedal 95 so that dog 89' engages the lower end of the rod 89 and lifts the lever 87 so that the flange 84 on the collar 81 is freed from the lever tooth to enable the coil spring 86 to move the clutch 82 out into engagement with the clutch member 77 on the sprocket wheel 78, thereby forming driving connection between the shaft 73 and the main driving mechanism, which is operable from the large traction wheel, and as soon as the clutch becomes active the arms 97 are revolved cranking the toggle connection beneath the shaft 73 and the fork, so that the fork is raised on its pivotal mounting to the position indicated in dotted lines Fig. II, in which the shocks carried by the fork are dumped onto the horizontal section of the conveyer to be carried through the conveyer and delivered into the wagon which is traveling alongside of the loader. As the dog 89' is actuated it lifts the rod as described and passes onwardly out of contact therewith, the spring 89'' being tensioned as the rod moves upwardly so that as soon as the dog leaves its contact with the rod the rod will be forced back to its original position thereby returning the latch tooth to position on the inside of the clutch flange. As the shaft 73 completes a revolution the tooth is projected into the worm groove 85 thereby working the clutch collar back out of engagement with its mating member so that as the tooth passes to the outside of the flange the driving connection is broken and remains broken until the parts are again released.

By providing the automatic mechanism just described the release may be made by single motion of the operator's foot, and when once made the pick-up operation will be completed automatically. In order that the tripping dog 89' may be returned to initial position after the return of the rod 89 I have pivoted the rod to its carrying crank and provided the spring 92' for holding it in position for engaging the face of the rising lug, such mounting enabling the lug to push the pin laterally when returning to set position, and the spring being adapted to automatically return the rod to its set position after the lug has passed. It is apparent that providing the spring controlled clutch 31—32, the fly-wheel shaft may continue to revolve after the machine has stopped, by pushing the loose clutch member back against the tension of the spring, as otherwise the weight of the fly-wheel might twist or break the parts. The fly-wheel is not essential to the proper operation of the machine but facilitates and assists the lifting of the fork.

Having thus described my invention, what I claim as new therein and desire to secure by Letters-Patent is:—

1. A shock loader comprising a carrying frame, a fork movably mounted on said frame, a driving mechanism comprising a normally inert shaft having operative connection with the fork, a driving clutch loose on said shaft, a driven clutch keyed on said shaft and yieldingly tensioned toward the driving clutch, a lever adapted for retaining said keyed clutch out of contact with its mate, manually controlled means for moving the lever to release said clutch, and worm members on the clutch and lever for returning the clutch to inactive position.

2. A shock loader comprising a carrying frame, a fork movably mounted on said frame, a driving mechanism comprising a normally inert shaft having operative connection with the fork, a driving clutch loose on said shaft, a driven clutch keyed on said shaft and yieldingly tensioned toward the driving clutch, a flange on said clutch having a worm groove, a lever having a tooth adapted for engagement with said flange to hold the clutch against its tensioning means and for travel in the flange groove to return said clutch, means for yieldingly tensioning said lever toward its holding position, and manually controlled means for rocking said lever.

3. A shock loader comprising a carrying frame, a fork movably mounted on said frame, a driving mechanism comprising a normally inert shaft having operative connection with the fork, a driving clutch loose on said shaft, a driven clutch keyed on said shaft and yieldingly tensioned toward the driving clutch, a flange on said tooth having a worm groove, a lever having a tooth adapted for engagement with said flange to hold the clutch against its tensioning means and for travel in the flange groove to return said clutch, a rod pivotally connected with said lever, a spring for yieldingly holding said rod and lever in lowered position, a tripping rod having a dog adapted for lifting said lever rod, a spring for holding said lever rod in position for engagement by the dog, and a pedal for operating the tripping rod.

In testimony whereof I affix my signature in presence of two witnesses.

PAUL T. ZOLLARS.

Witnesses:
LETA E. COATS,
W. A. BUDD.

---

Copies of this patent may be obtained for five cents each, by addressing the "Commissioner of Patents, Washington, D. C."